RECEIVING DEVICE WITH SIGNAL VOLTAGE CONVERTER

Filed April 10, 1964

INVENTOR

JAMES T. NEISWINTER
CARL N. PEDERSON

BY Strauch, Nolan & Neale

ATTORNEYS 3,370,124
Patented Feb. 20, 1968

3,370,124

RECEIVING DEVICE WITH SIGNAL VOLTAGE CONVERTER

James T. Neiswinter, Garden City, N.Y., and Carl N. Pederson, Westmont, Ill., assignors to Pioneer Electric & Research Corporation, Forest Park, Ill., a corporation of Illinois Filed Apr. 10, 1964, Ser. No. 358,739
3 Claims. (Cl. 178—70)

ABSTRACT OF THE DISCLOSURE

A signal voltage converter circuit for connecting between data communication equipment operable at low voltage levels and transmission lines normally operable at high voltages. The circuit has a high voltage input portion electrically isolated from a low voltage output portion, the input portion including an oscillator circuit responsive to differences in incoming mark and space signal representative of one of the two forms of signal bits. A transformer between the input and portions transfers the oscillatory signal bits to the output portion which includes two signal channels, one channel providing code signals in response to the oscillator output and the second channel including a time delay circuit and being responsive to signal transmission through the first channel to provide output signals indicative of transmission and of no transmission of code signals through the first channel.

*Background of the invention*

Figures 1, 2:
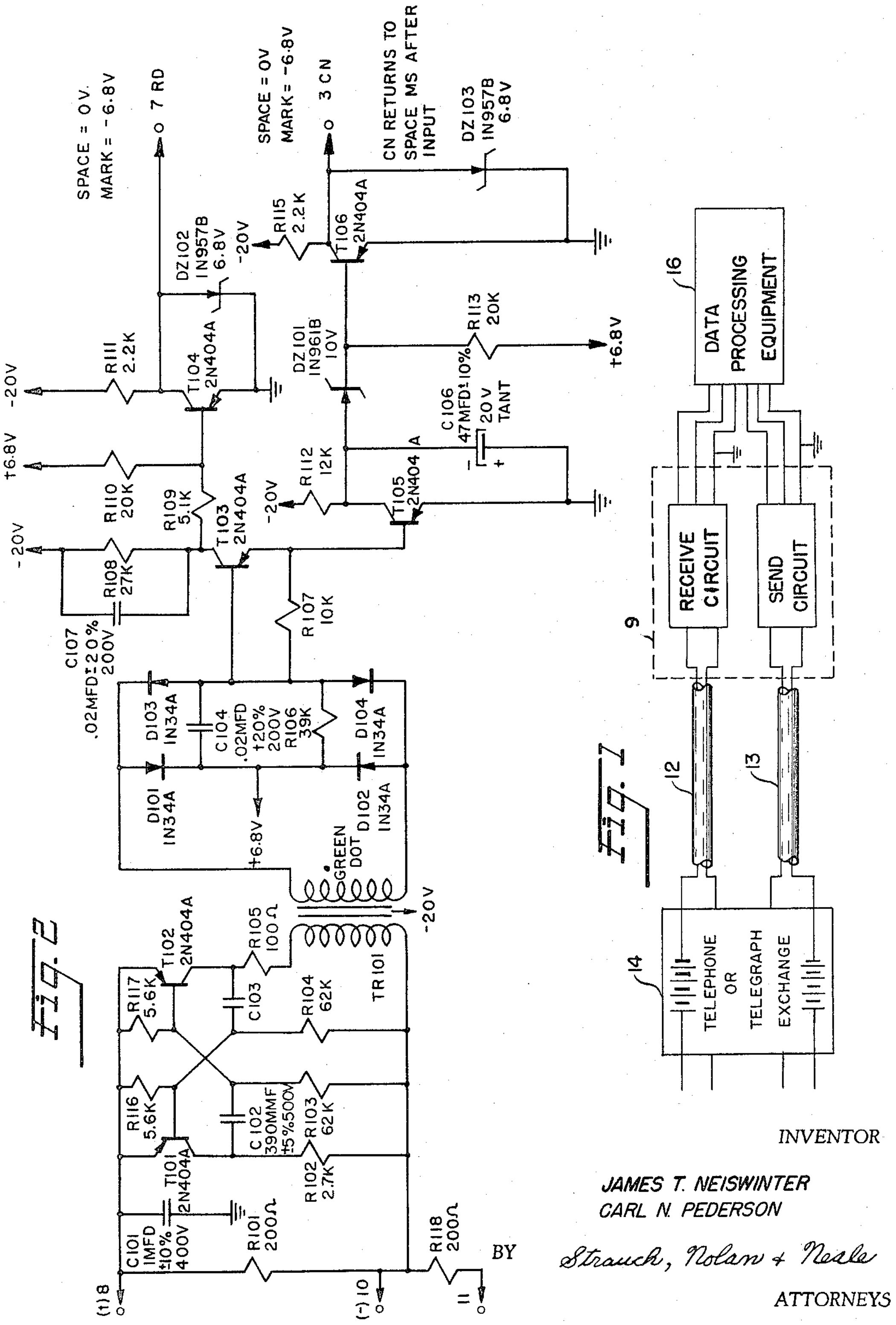

The present invention relates to signal converters which may be used as an interface between a low voltage data transmitting and receiving device, such as a business machine, and a high voltage telegraph loop as is normally supplied by telephone or telegraph companies, and more particularly to a novel circuit arrangement for use at the location of a business machine as the receive circuit so that the business machine may communicate directly with a conventional telecommunication line.

The signal voltage on the telegraph loop is comparatively high, and usually 130 or 260 volts, with a current flow of about 60 ma. for the mark condition and zero current for the space condition. Normally, batteries are provided by a central office, a fixed load resistance is present at the receiver station and a suitable keyer is provided at the send station to generate the mark signal voltage by closing the telegraph loop and the space signal by opening the loop circuit. A mark signal is conventionally produced by closing the circuit so that the battery voltage is impressed across the load resistance and a space signal is characterized by an open circuit in timed relation to the start pulse.

On the other hand, business machines customarily operate with comparatively low signal voltages. The E.I.A. (Electronic Industry Association) standard specifies a negative voltage of between −3 and −20 for a mark and between about +3 and +20 for a space, with a low current flowing for one or both conditions. In some cases a business machine may use the negative voltages for mark and about zero volts for space. In other cases the machine may use about zero volts for mark and the plus voltages shown for space. In any of the cases, the problem presented is one of converting high voltage signals on the telegraph loop to low voltage signals for the business machine with the requisite variation in the values of the low voltages.

The principal object of the present invention is to provide an improved interface or signal voltage converter for use with comparatively low signal voltage equipment such as business machines to thereby adapt such equipment to receive input data from conventional telephone or telegraph lines using their customary comparatively high voltage signals.

The receive circuit converts the comparatively high voltage telegraph loop signals to the comparatively low voltage business machine signals. The power supply, which furnishes the voltages required for the operation of the transistors, may be of any suitable type, and forms no part of the present invention.

Other objects of the invention are to provide:

(1) a novel receive circuit that has input terminals and associated circuitry which are isolated from ground at the receive station and which converts the comparatively high voltage telegraph loop signals into comparatively low voltage signals for transmission to the data processing equipment; and (2) a novel receive circuit containing a pair of signal paths, one carrying the coded information and the other carrying a signal which may be used to identify end of transmission of input data.

These and other objects of the invention will become more fully apparent from the claims, and from the description as it proceeds in connection with the appended drawings wherein:

FIGURE 1 is a block diagram showing the novel signal converter of the present invention at a location adjacent the low signal voltage equipment and connected between an exchange office of a telephone or telegraph system and the input and output of the low signal voltage equipment; and FIGURE 2 is a circuit diagram of a receive circuit embodying the present invention.

Referring now to FIGURE 1 of the drawings, the present invention is incorporated within the block 9 representing the signal converter of a communications system utilizing a pair of transmission lines 12 and 13 that are connected through a telephone or telegraph exchange 14 to a further piece of data processing equipment (not shown) containing a sending circuit and receiving circuit which may be identical to that of blocks 9 and 16. At the local station, normally at close proximity to the signal converter 9 of the present invention, there is a business machine 16 that operates with input data received from transmission line 12 and which may send out data over transmission line 13.

The overall function of the receiver circuit of FIGURE 2 is that, on the reception of a 20 to 60 ma. current on its input between terminals 8 and 10 at the left-hand side of FIGURE 2, it presents approximately −6 volts on its RD (Receive Data) output terminal 7 to the business machine; and that, on the reception of a "no current" condition on its input, it will present approximately zero volts on the RD terminal 7. These are representative voltages and in this case are the voltages required by the first user of the device. The presentation of other voltages between −20 volts and +20 volts to comply with the E.I.A. standard referred to above for mark or space on RD terminal 7, involves small changes in the circuitry that have no bearing on the characteristic features of the circuit.

An important requirement of the receiver is that the voltages and grounds on the high voltage input terminal side must be isolated from the voltages and grounds on the low voltage or output terminal side. The isolation of the grounds is necessary because the ground for the high voltages can be several miles away in a central office, and the actual voltages with reference to ground that appear at the input of the receiver may have greatly different values from time to time depending upon how the resistance in each side of the loop to the central office is distributed.

On the input side of the receiver, connection is made to the telegraph loop by placing a resistance of either 200 ohms, or 100 ohms in series with the loop through transmission line 12 and exchange 14. When the marking loop current is 20 ma., the 200 ohm resistor R101 is used and the voltage developed across it may be about 4 volts. When the marking loop current is 60 ma., the two 200 ohm resistors R101 and R118 are placed in parallel as by use of a jumper between input terminals 8 and 11 to obtain an effective load resistance of about 100 ohms, and the voltage developed across the combination may be about 6 volts.

Transistors T101 and T102 are part of a free running, normally non-operating multi-vibrator circuit which receives its operating voltage from the loop circuit, and more specifically from the voltage drop across the resistor R101 in series with the loop. When the loop indicates a marking signal, the multi-vibrator circuit will be supplied with from about 4 to 6 volts and will operate. When the loop circuit is open, indicating a spacing signal, which is the no current condition, the multi-vibrator circuit will not operate.

The frequency of the multi-vibrator may be of the order of 2000 cycles. The value of this frequency need be only high enough so that one cycle is not an appreciable part of a bit length of the data signal being received, and low enough so that the signal will pass through a small transformer TR101 without excessive loss. When the multi-vibrator is operating, the audio frequency is transmitted through transformer TR101 which isolates the input and output circuits from each other completely. It is apparent the other types of oscillator circuits could be used if desired.

The audio frequency on the output of transformer TR101 is rectified by diodes D101 to D104 which are connected in a full wave bridge arrangement. The bridge circuit output is a negative voltage during a marking condition which, when present, will make normally non-conducting transistors T103 and T105 conduct.

Transistors T103 and T104 comprise a first signal channel. The output of transistor T103 is connected to control the conducting condition of normally conducting transistor T104. Transistor T103, when conducting will make transistor T104 non-conducting. This will tend to cause −20 volts to appear at the collector of transistor T104. However, the −20 volts will be clamped to about −7 volts by zener diode DZ102. Therefore, a marking current on the loop input of the receiver will cause a voltage of about −7 volts on the RD terminal 7 of the receiver.

When the current on the loop at the input goes to zero for the space condition, no audio current will be created by the multi-vibrator to be applied to transformer TR101. Transistors T103 and T105 will go non-conducting due to the back bias voltage applied through the bridge circuit from the +6.8 volt tap through resistor R106 to the base of transistor T103 and through resistor R107 to the base of transistor T105. With transistor T103 non-conducting, transistor T104 will go conducting to apply about zero volts to the RD terminal 7 for the space condition.

Transistors T105 and T106 comprise a second signal channel which will apply about −7 volts to the CN terminal 3 while a combination of mark and space pulses are present in the signals, and will apply about zero volts to the CN lead approximately 300 milliseconds after the input loop goes continuously spacing. The function of this signal channel is to notify the business machine when the input loop circuit has gone continuously spacing, which occurs normally after a distant business machine has finished sending a message.

Transistor T105 goes conducting immediately on each mark pulse, and discharges capacitor C106.

On each space pulse, capacitor C106 starts to charge towards −20 volts.

If the space pulse continues for approximately 300 ms., capacitor C106 will charge to a voltage of about −10 volts, which is sufficient to pass through zener diode DZ101 and cause transistor T106 to conduct.

Transistor T106 is normally non-conducting during the presence of marking signals on the input, and in this condition applies −20 volts to zener diode DZ103 which clamps this voltage to about −7 volts. This is the signal to the business machine that the input of the receiver is either steady marking or that data signals are being received.

When transistor T106 conducts, the voltage applied to the CN terminal 3 is about zero, which is the indication to the business machine that the input circuit is in a steady spacing condition.

The remaining components not specifically mentioned are used in their normal manner well-known to those skilled in this art, and further discussion is therefore deemed unnecessary.

The phrase alternating voltage signal as used in the claims is intended to cover all types of non-steady voltage signals including output signals from circuits such as, but not limited to, multi-vibrators which may be square waves and from the circuits here employing unijunction transistors which may have a saw-tooth or other configuration.

From the foregoing, it is apparent that there is provided by the present invention an interface or buffer unit uniquely adapted for connection to a piece of office data processing equipment to enable it to receive directly the comparatively high marking and spacing signal voltages present on a conventional telephone or telegraph line. The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A signal converter comprising:

input terminals adapted for connection to a transmission line which is part of a telecommunication loop containing a comparatively high mark and space signal voltage in excess of about 100 volts;

an oscillator circuit connected to said input terminals for producing unique signals responsive to reception of mark and space signal voltages;

an isolation transformer having input terminals connected to receive the output of said oscillator circuit and having output terminals; and a pair of signal channels each having its input connected to the output terminals of said isolation transformer;

one of said signal channels being responsive to said unique signals characterizing the mark and space signals for producing comparatively low mark and space signal voltages no greater than about 20 volts; and the other of said signal channels containing a time delay circuit for producing a first continuous signal responsive to the presence of a mark and space signal voltage and a second continuous signal after a period of predetermined duration when no mark signal voltage is received.

2. A signal converter comprising:

input terminals adapted for connection to a transmission line which is part of a telecommunication loop containing a comparatively high mark and space signal voltage in excess of about 100 volts;

output terminals adapted for connection to data processing equipment;

an oscillator circuit connected to said input terminals for producing a signal responsive to reception of a mark signal voltage and to be supplied with operating power solely from said transmission line;

an isolation transformer having input terminals connected to output terminals of said oscillator circuit and having output terminals; and a signal channel responsive to the said signal characterizing the mark signal for producing a comparatively low mark voltage no greater than about 20 volts and responsive to a space signal for producing a different low voltage no greater than about 20 volts.

3. A signal converter comprising:

input terminals connected to a transmission line which is part of a telecommunication loop containing comparatively high mark and space signal voltages in excess of about 100 volts;

output terminals connected to data processing equipment;

a pair of transistors connected as a free-running multivibrator circuit electrically floating relative to reference voltages at said converter, said circuit being connected to said input terminals for producing unique signals responsive to reception of mark and space signal voltages; and to be supplied with operating power from said transmission line;

an isolation transformer having a primary winding connected to receive the output of said oscillator circuit and having a secondary winding connected to a bridge circuit; and a pair of signal channels each having its input connected to said bridge circuit;

one of said signal channels being responsive to said unique signals characterizing the mark and space signals for producing comparatively low mark and space voltages no greater than about 20 volts comprising a normally non-conducting transistor, a normally conducting transistor and a zener diode with one of said output terminals connected to a common connection between the zener diode and the normally conducting transistor; and the other of signal channels containing a capacitor connected to be charged in response to reception of a mark signal, a normally conducting transistor connected to be biased to a non-conducting condition when said capacitor is charged and to remain nonconducting for a period of time much greater than the data signals being transmitted, and means including a zener diode for providing a continuous voltage signal of a first magnitude indicating that reception of data is in progress and a continuous voltage of a second magnitude indicating no transmission of data.

No references cited.

THOMAS A. ROBINSON, *Primary Examiner.*